PRESSURE PAD

Filed Oct. 21, 1963 2 Sheets-Sheet 1

INVENTOR.
KENNETH L. LOCKEY
BY Gerald R. Hibnick
ATTORNEY.

INVENTOR.
KENNETH L. LOCKEY
BY Gerald R. Hibnick
ATTORNEY.

United States Patent Office 3,370,157

Patented Feb. 20, 1968

3,370,157

PRESSURE PAD

Kenneth L. Lockey, Livonia, Mich., assignor to Burroughs Corporation, Detroit, Mich., a corporation of Michigan Filed Oct. 21, 1963, Ser. No. 317,525

8 Claims. (Cl. 235—61.11)

This invention relates generally to a data processing apparatus for high speed transportation and processing of magnetically striped ledgers and in particular to a sheet guiding and bending pressure pad associated with the magnetic transducers of the processing apparatus.

In the processing of magnetically striped ledgers, as employed in the banking field, a ledger is driven at high speed along guideways past processing stations which contain magnetic transducers for reading the previously encoded data stored on the magnetic stripe, erasing the data, and subsequently encoding the stripe with updated information. The physical relationship between the stripe on the moving ledger and a transducing gap in the head of the transducer is oritical. For optimal ledger processing, a predetermined, unvarying space must lie between the surface of the head adjacent the transducing gap and the magnetic stripe. Included within the meaning of "unvarying space" is actual surface contact of the stripe to the head. This aspect of the physical relationship should be unvarying not only along the length of a particular magnetic stripe, but along the stripe of all ledgers passing a particular transducer head over a long period of time. If the spacing between the stripe and the transducing gap fluctuated, aberrations would arise in the signals received by the transducer during reading thereby causing errors. Similarly, the lack of spacing uniformity could cause incomplete erasing and imperfect encoding of data on the magnetic stripe.

The maintenance of an unvarying spacial relationship between the magnetically striped ledger and the transducer is especially difficult, since the head of the transducer has a convex profile somewhat like a prism with a rounded crown; the reading, erasing, and writing occur only at the point that the stripe passes across the very narrow transducing gap or slot in the crown; and further because of the relatively high linear speed of travel of the ledger past the narrow slot in the transducer head.

Several attempts have been made to perfect apparatus which would present the rapidly moving ledger to the transducer head in a uniformly spaced manner. One attempt provided means for guiding the ledger tangential to and in a floating relation from the head. Due to the nature of the guiding mechanism and the rapidly advancing ledger itself, the air space between the magnetic stripe on the ledger and the narrow slot in the transducer head was subject to uncontrollable fluctuations, thus causing improper signal transmission.

Another guiding means employed a biased idler roller which forced the ledger into tangential surface contact with the head adjacent its transducing gap. Although this proved successful at low speeds, at high speed the striking of the rapidly advancing leading edge of the resilient ledger against the transducer head and the idler roller caused damage to the ledger and considerable uneven wear to the head so as to aperiodically change the dimensions of the transducing gap and to form pockets in the head, thereby preventing continuous surface contact between it and the magnetic stripe. Hence, frequent testing, adjustment, and replacement of the parts were necessary.

Accordingly, it is one object of this invention to provide a pressure pad which cooperates with a magnetic transducer head to guide a ledger uniformly around and against the surface of the transducer head to enable accurate transducer operation.

Another object of this invention is to provide a pressure pad construction having several biased surfaces each angularly disposed from the next for guiding a ledger around and against an adjacent transducing head and for reducing the frictional wear to the head.

Another object of this invention is to provide a uniquely shaped pressure pad which prevents an air space from developing between a rapidly moving sheet and a transducer head and thereby increases the accuracy of transducer signal transmission.

Another object of this invention is to provide a pivotally biased pressure pad, having several angularly distinct facets, to obviate damage to a rapidly transported flexible sheet passing between and against the pressure pad and an adjacent transducing station.

A further object of this invention is to provide a specially configurated guide pad which is biased toward a transducing head and a sheet being transported therebetween to balance the frictional wear caused by the sheet to the transducing head and the guide pad to thereby minimize their periodic adjustment and replacement.

Stated briefly, this invention comprises a multi-surfaced pressure pad adjacent to and pivotally biased toward a transducer head. The biased pad normally has one of its intermediate surfaces in tangential contact with the convex crown of the head. The leading edge of an advancing ledger cams against the leading surface of the pad, opposes the bias, and is then directed against the transducer head. As the ledger progresses further, it is forced into tangential contact with two other angularly displaced pad surfaces which cause the ledger to assume a curved profile similar to that of the head, to lie against the head adjacent the transducing gap, and thereby to insure proper ledger processing with a minimum of wear to the respective elements.

Other features and objects of this invention will become apparent by references to the following description taken in conjunction with the accompanying drawings in which.

Figures 1, 6:
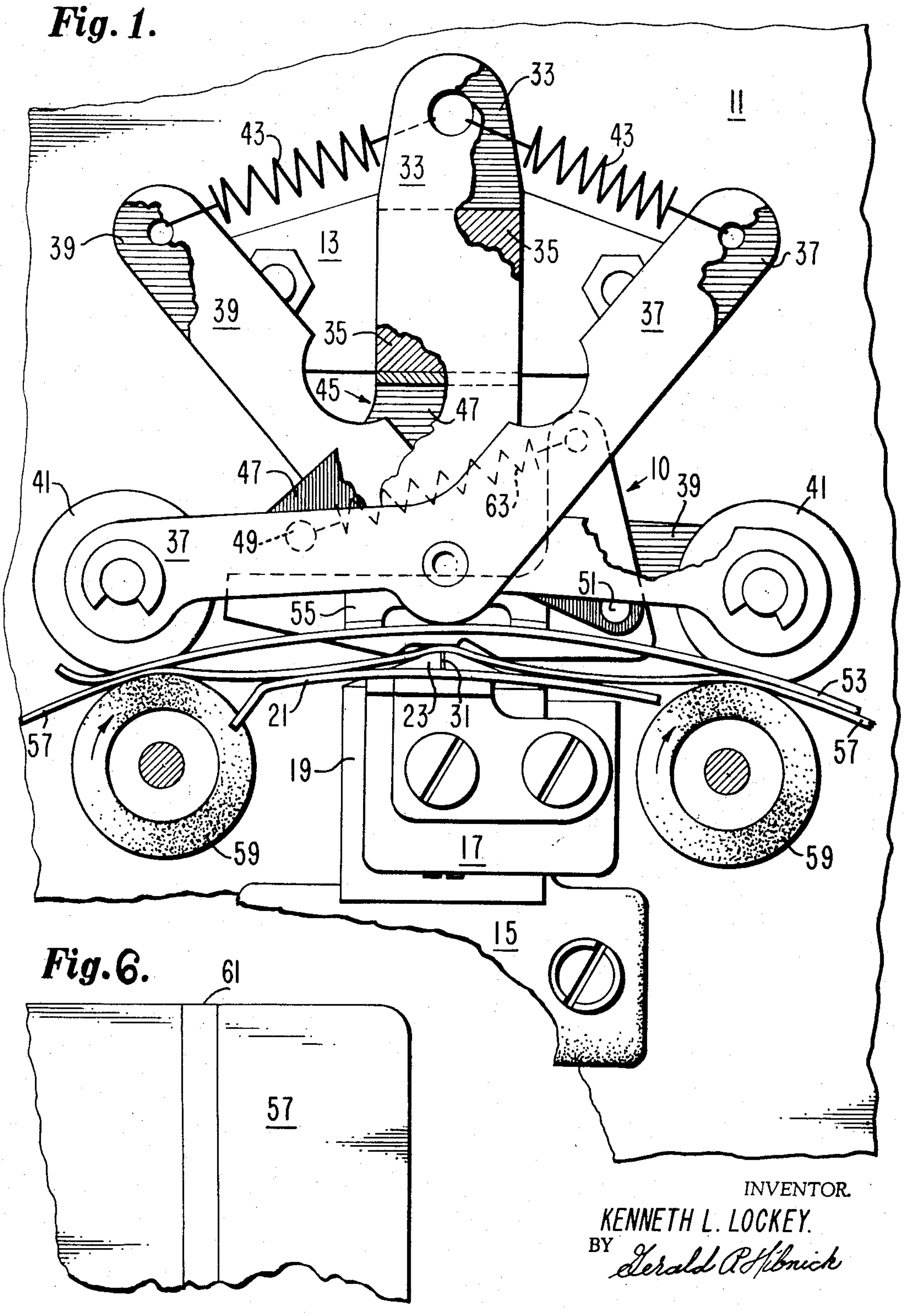
FIG. 1 is a partially broken away, side elevation of the pressure pad of this invention and associated environmental structure.
FIG. 6 is a view of a portion of the back surface ledger showing the magnetic stripe.

With reference to FIG. 1, the pressure pad 10 and its associated elements are shown mounted to a side frame 11 of a ledger processing apparatus of the type shown, for example, in U.S. Patent 3,070,204 issued on December 25, 1962 to Robert S. Bradshaw and entitled "Sheet Handling Apparatus." Although the figures and description of the present invention are directed to an upright orientation of the elements, it will be appreciated that successful operation can be obtained in an orientation as shown, for example, with reference to the pressure plates "*p*" in FIG. 4 of the Bradshaw patent.

Figures 2, 3, 4, 5:
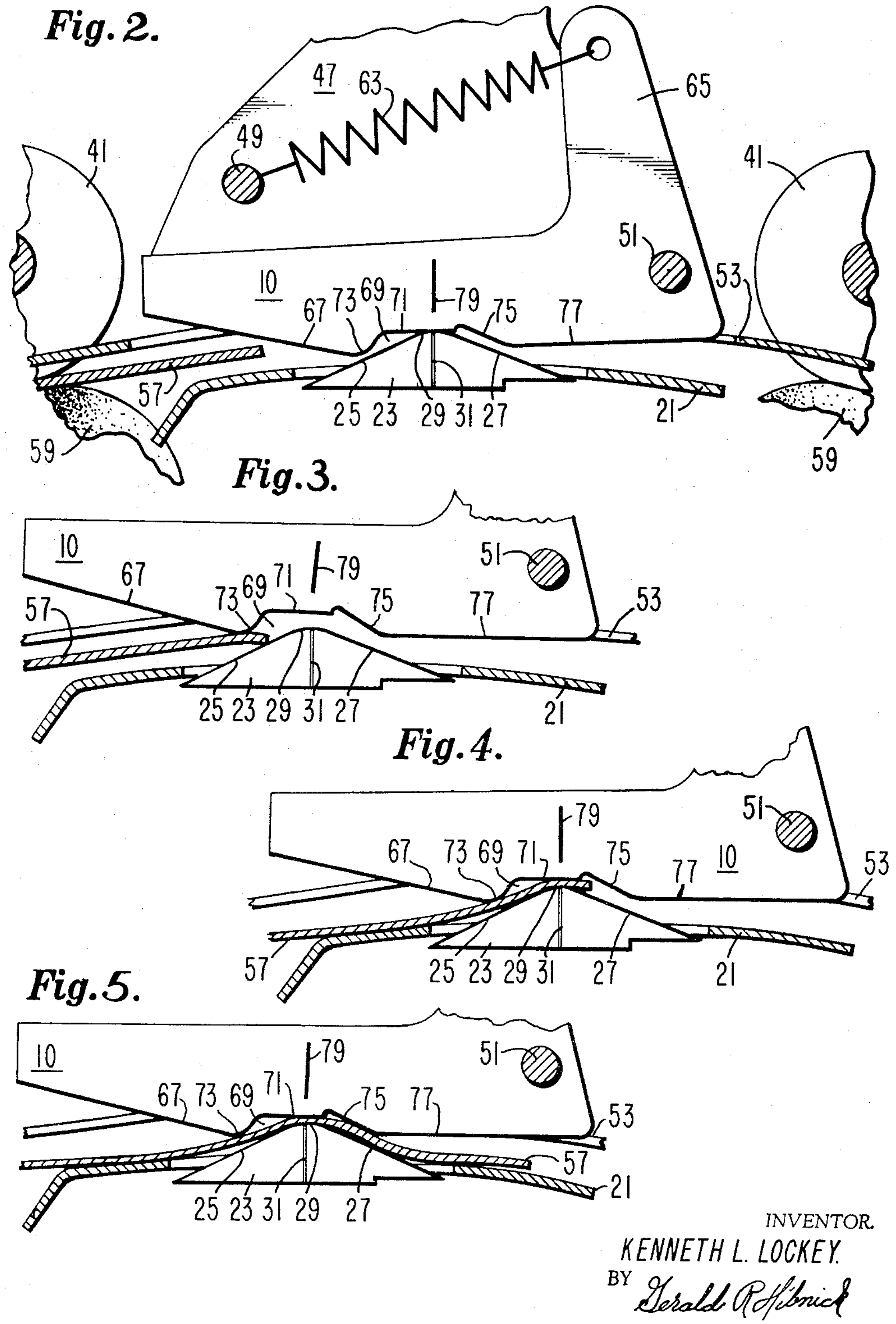
FIGS. 2–5 are similar enlarged sectional elevations showing the path of the ledger as it is guided by the pressure pad past the transducer head.

Mounted by conventional means to the side frame 11 and extending perpendicularly therefrom are spaced upper and lower anchor brackets 13, 15. Secured to the lower anchor bracket 15 is a housing 17 for rigidly holding a magnetic transducer 19. Firmly fixed to the housing is a lower guide plate 21 having an aperture therein for the passage therethrough of the head 23 of the transducer. As shown in FIG. 2, the transducer head 23 has a pair of oppositely beveled leading and trailing surfaces 25 and 27 which are joined by a convexly curved surface 29 which forms the apex, crown, or dome of the head. A transducing gap 31 bisects the head and opens into the crown 29.

Again with reference to FIG. 1, the upper anchor bracket 13 is formed to provide a pair of spaced apart posts 33 which are joined by a crossmember 35. Pivotally mounted to the bracket 13 near the bottom of the posts are two pairs of spaced apart lever arms 37 and 39. Journaled between each pair of lever arms near their lower ends is an idler roller 41. Atttached to the upper end of each of the four lever arms is one terminus of a spring 43 which has its other terminus secured to the upper end of one of ths posts 33 to thereby bias the lever arms and their idler rollers downwardly.

Fixed to the bottom side of the crossmember 35 is a U shaped brace 45 having its pair of legs 47 spaced from and parallel to the lower portion of the posts 33. A pair of parallel rods 49 and 51, each adjacent and parallel to one of the idler rollers 41, are joined to opposite legs of the brace. An upper guide plate 53 is secured onto the legs of the brace 45 by a pair of oppositely facing angle supports 55 and is oriented parallel to the lower guide plate 21. The upper guide plate 53 is apertured throughout its central section and thereby allows the entrance of the downwardly biased idler rollers.

As viewed in the figures, the left or forward ends of the guide plates 21 and 53 are curved away from each other and form an entranceway for approaching ledgers 57 which are traveling between a guideway, not shown. The right or rearward ends of the guide plates 21 and 53 form an exit for the processed ledgers and are directed toward another guideway, not shown. The relationship of these guideways to the guide plates, the transducer, and the pressure pad can be understood best with the reference to FIG. 4 of the above cited Bradshaw patent.

A drive roller 59 is positioned below each of the downwardly biased idler rollers 41 and cooperates therewith to grip both surfaces of the advancing magnetically striped ledger and transport it rearwardly past the transducer head 23, during which time the drive roller 59 and the transducer head are in contact with the magnetic stripe 61 which is formed on the lower surface of the ledger 57 as depicted in FIG. 6.

As hereinabove discussed, a critical physical relationship must be maintained between the magnetic stripe 51 on the rapidly advancing ledger 57 and the narrow transducing gap 31 in the transducer head. In order to present the magnetic stripe to the transducer for the best electromagnetic response, it has been found that the stripe ledger should be bent around the convex surface 29 of the head for at least five degrees of curvature on either side of the gap 31.

The pressure pad 10, as best shown in FIG. 2, is a unitary element having the general profile of a bell crank and having a thickness or width about equal to that of the transducer head. The pad should be constructed of a hard material having a low coefficient of friction such as nylon. The pressure pad is pivotally mounted on the rod 51 which extends through a bore near the apex of the pad. A pair of springs 63 extend upwardly and rearwardly from the rod 49 and into an aperture in each of the upstanding arms or ends 65 of the pressure pad and thereby bias the lower surface of the pad downwardly through the aperture in the upper guide plate 53 and against the transducer head 23.

As seen best in FIGS. 2 and 3 the lower surface of the pressure pad 10 comprises three angularly displaced planar surfaces or facets which tangentially coact with the advancing ledger 57 to bend it around the transducer head. The leading facet 67 is canted toward the transducer head as to intersect an intermediate portion of its leading surface 25. As depicted by FIG. 2, an approaching ledger will be driven obliquely against the leading facet 67 and will ride down its slope. The initial impact of the ledger against the leading facet will cause the pressure pad to be cammed upward against the bias of the springs 63.

As the leading edge of the ledger passes rearward of the leading facet 67, as shown in FIG. 3, it will be directed against the leading surface 25 of the transducer head somewhat in advance of the transducing gap 31. Due to the general stiffness of the ledger and the fact that it is both in tangential contact with the facet 67 and in oblique contact with the surface 25, there will be an increased upward thrust against the biased pressure pad sufficient to pivot the pad clockwise so that temporarily there exists a wide enough passageway 69 between the transducer crown 29 adjacent the transducing gap 31 and an opposing central planar facet 71 of the pressure pad for the unrestricted entrance of the leading edge of the ledger.

By the time that the leading edge of the ledger has passed the transducing gap 31, as shown in FIG. 4, the upward thrust has diminished to the extent that the bias springs 63 are capable of urging the pressure pad 10 downwardly to constrict the passageway 69 until the central facet 71 bears down upon the ledger which in turn is forced against the crown 29. As shown, the central facet 71 lies in a plane above the rearward terminus of the leading facet 67, establishing therebetween an offset or rounded shoulder 73. As shown in FIG. 4, the shoulder 73, upon which the ledger rides continuously, will be close enough to the leading surface 25 of the transducer head so as to bear down upon the ledger and force it against the leading surface in advance of the crown 29 and cause the ledger to ride upon the leading surface to the point where there is coaction with the central facet 71 which, as above stated, urges the ledger against the crown 29.

As the ledger is driven further rearward, it will obliquely strike an inclined facet 75 of the pressure pad. The inclined facet 75 is oriented substantially parallel to and is spaced slightly more than a ledger thickness above the similarly inclined trailing surface 27 of the transducer head 23. The rapidly moving ledger will be deflected by the inclined facet 75 and caused to follow the trailing surface 27 near to the point that it is intersected by the lower guide plate 21. Because of the proximity of the inclined facet 75 of the pad to the trailing surface 27 of the head, the ledger will be forced to maintain its surface contact with the convex crown 29 of the head rearward of the transducing gap 31, as shown in FIG. 5. After the leading edge of the ledger passes rearward of the transducer head, it will be guided between the lower guide plate 21 and the trailing facet 77 of the pressure pad to the point that it reaches the upper guide plate 53 and finally the rearward rollers 41 and 59 as shown in FIG. 1.

It is now apparent that the pressure pad is configurated to form a recessed trough or pocket for receiving the crown of the transducer head, but that the facets and shoulder that comprise the limits of the trough do not conform to the profile of the head. The pressure pad thus cooperates and coacts with the transducer head and the rapidly transported ledger to cause the magnetic stripe on the lower surface of the ledger to be bent around and to be maintained in contact with and against the transducer head for a sufficient distance on either side of the transducing gap to insure the critical physicial relationship between the stripe and the gap necessary for proper data processing.

As also described, the leading edge of the ledgr is driven along a sinuous path between upper and lower limiting means in a manner that will minimize damage to the leading edge as well as the rest of the ledger so as to permit numerous passes of the ledger through the data processing apparatus.

Since the ledger is bent around the crown of the transducer head and is in full surface contact a relatively large distance on either side of the transducing gap, the surface contact being induced by uniform downward pressure by the various facets of the biased pressure pad, the wear upon the crown by the ledger will be considerably diminished and will be symmetric or uniform. Therefore, even after long use, the transducer will not need to be replaced or its position adjusted. Since the shoulder 73 and the facets 71 and 75 of the biased pad apply a uniform pressure upon the upper side of the ledger, they will be worn down equally and thereby maintain their precise guidance of the ledger. To aid in the continuing uniform pressure upon the ledger, the rod 51, about which the pressure pad pivots, is oriented as close as practical to the upper guide plate 53. This causes the biased pad, at its points of tangency with the ledger, to pivot in an arc that is substantially parallel to the transducing gap. To assist in the alignment of the pressure pad with the transducer, a scribe mark 79 is placed on the pressure pad above and perpendicular to a particular point on the central facet 71. By lining up the scribe mark 79 with the transducing gap 31, the pressure pad will be aligned.

While there have been shown and described the fundamental novel features of this invention as applied to a preferred embodiment in a particular type of apparatus, it will be apparent to those skilled in the art that variations may be made therein without departing from the spirit of the invention.

What is claimed is:

1. In an apparatus for transporting a magnetically encoded information bearing sheet around and in surface contact with a magnetic transducing head and for reducing frictional wear and damage to said sheet and the surface of said head:

a pressure pad mounted on said apparatus adjacent said head and having a first face obliquely entering into the path of said sheet in advance of said head and second, third, and fourth spaced and angularly distinct faces parallel in part to different portions of said head and lying in close proximity thereto and defining therebetween a serpentine guideway for said sheet.

2. A device for guiding and bending a resilient sheet past and around a transducer head comprising:

a configurated pressure applying pad having segments coactable with spaced points along one surface of said sheet and cooperable with surface portions of said head thereby made abutting to the other surface of said sheet between said points, the profile that said sheet assumes as it passes said head being distinct from the configurated profile of said pressure applying pad and similar to the profile of said head.

3. In an apparatus for handling separated sheets provided with information carrying segments, said apparatus having a guideway for said sheets and a dome-shaped transducer means extending from one side of said guideway partly into said guideway and into the path of said sheets:

a configurated pressure pad mounted on the other side of said guideway and biased toward said transducer and into the path of said sheets, said pressure pad having a plurality of adjacent planar sheet guiding surfaces differently inclined relative to one another and of a configuration dissimilar to that of said transducer means and defining therewith a constricted pathway, one side of which is formed by said transducer means and the other side of which includes portions of said pad surfaces biased against a sheet received between said pressure pad and said transducer means.

4. For an information processing machine which encodes and decodes information on portions of magnetically coated separated ledger sheets, said processing machine having a guideway for said sheets, a processing station including a magnetic transducer positioned on one side of said guideway and having a convex surface directed into said guideway, and means for driving said ledger along said guideway past said transducer:

a pressure pad positioned on the other side of said guideway opposite to and biased against said convex surface of said transducer and having a configurated profile facing said transducer including a canted leading surface forming with a leading surface portion of the transducer a converging entrance for the sheet guideway, a flat central surface aligned with the apex of and spanning said convex surface of said transducer, and a canted trailing surface extending from said flat central surface in the direction of a trailing surface of the transducer, the said flat central surface being between both of said canted surfaces of said pressure pad and defining a trough guiding said ledgers around and against said convex surface of said transducer.

5. In an apparatus in which sheets are rapidly transported along a prescribed pathway past a transducer having a curved surface portion extending into said pathway:

a plural faceted sheet guiding and bending element pivotally mounted to said apparatus adjacent said transducer and forming said pathway therebetween, one facet of said element bearing tangentially against the curved surface portion of said transducer and cooperating with other of said facets of said element and with other surface portions of said transducer on opposite sides of the said curved surface portion of the latter to flex and guidably bend said transported sheets against said curved surface portion of said transducer, said other facets of said element being disposed on opposite sides of said one facet in sloped relation thereto and each having an altitude projecting beyond the altitude of said curved surface portion.

6. In an apparatus for transporting sheets along a guideway past a transducer having oppositely inclined face joined by curved faces extending into one side of said guideway, a multiple surfaced sheet bending and guiding element pivotally mounted on the other side of said guideway facing said transducer, said element having an intermediate one of its surfaces in tangential orientation with the curved face of said transducer blocking said guideway and further having a leading planar surface adjacent said intermediate surface directed toward one of the inclined faces of said transducer and a trailing planar surface adjacent said intermediate surface oriented parallel to the other of the inclined faces of said transducer, said leading surface of said element and its associated inclined face of said transducer having fulcrum points upon which a transported sheet coacts to pivot said element to unblock said guideway, and said curved face of said transducer and said intermediate and trailing surfaces of said element each having points of tangency with said sheet, said fulcrum points and said points of tangency defining a pathway for said sheet around and against said curved face.

7. A sheet guiding and bending element for guiding a flexible sheet having a magnetically encoded information bearing portion between the leading and trailing edges thereof past and around a magnetic transducer head cooperable with the magnetically encoded information bearing portion of the sheet, said head having an arcuate central portion with a tranducer gap at the inflection thereof intermediate oppositely directed surfaces of the head on opposite sides of the gap, said guiding and bending element cooperating with said head to form a sheet guideway therebetween in the path of sheet travel with the head on one side of the sheet path and the guiding and bending element on the other, said guiding and bending element having a configuration facing the head to form a sinuous path with the head for a sheet advancing therethrough and including a leading surface portion forming with one of the surfaces of the head on one side of the transducer gap a converging entrance of the guideway, a recessed flat central surface portion receiving the arcuate central portion of the head therein, and a trailing surface portion substantially similarly directed as the other surface of the head on the other side of the transducer gap, said guiding and bending element being pivotally mounted adjacent the trailing portion thereof and biased into contact with the arcuate central portion of the head at the recessed flat central surface portion of the guiding and bending element.

8. A device for guiding and bending a resilient information bearing sheet fed along a path of travel comprising a head of an information responsive device having a crown and a pair of oppositely inclined surfaces projecting into the sheet path with the oppositely inclined surfaces leading to and from the crown, and a yieldable pressure pad having three sheet engaging surfaces spaced apart in the direction of sheet travel and respectively overlying said crown and said oppositely inclined surfaces of said head.

References Cited

UNITED STATES PATENTS

| | | | |
|---|---|---|---|
| 3,029,021 | 4/1962 | Azari et al. | 235—61.11 |
| 3,032,750 | 5/1962 | Nelson et al. | 235—61.11 |

DARYL W. COOK, *Primary Examiner.*